Figure 1:
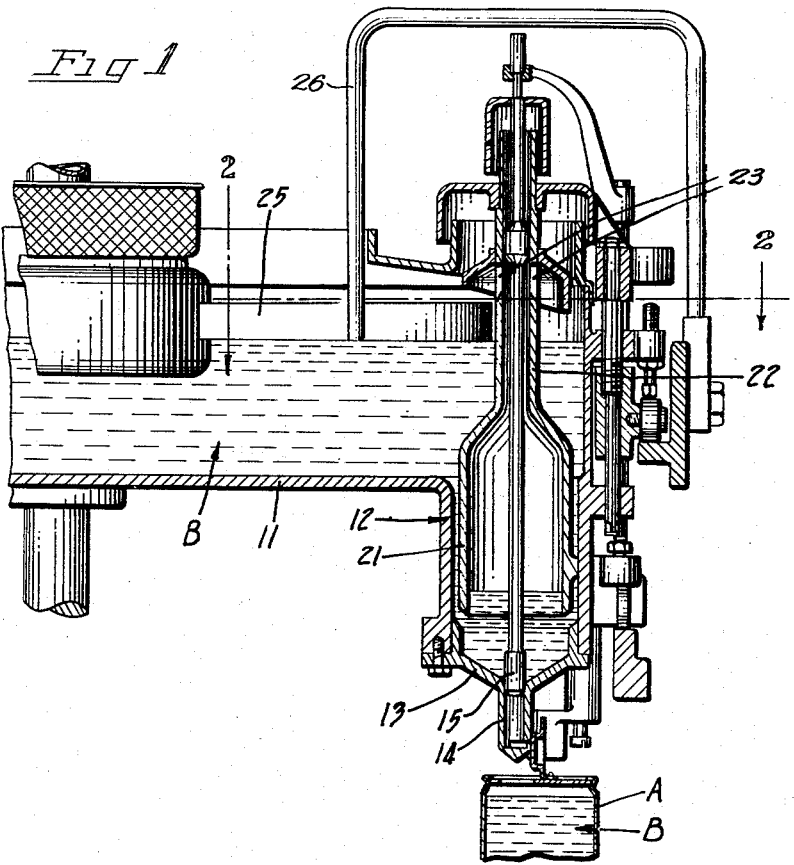

Feb. 1, 1944.    W. McK. MARTIN    2,340,336
FILLING MACHINE
Filed April 15, 1941

INVENTOR.
William McK. Martin
BY Ivan D. Thornburgh
Chas. H. Line
ATTORNEYS

Patented Feb. 1, 1944

2,340,336

UNITED STATES PATENT OFFICE 2,340,336

FILLING MACHINE

William McK. Martin, Maywood, Ill., assignor to American Can Company, New York, N. Y., a corporation of New Jersey Application April 15, 1941, Serial No. 388,682

2 Claims. (Cl. 226—69)

The present invention relates to liquid filling machines and has particular reference to deflecting foam which forms on the surface of some liquids away from the filling elements of the machine.

In the filling of containers such as cans and bottles with certain liquids, such as for example, milk, considerable foaming of the liquid sometimes takes place. The foam collects on the surface of the liquid in the machine. In some machines, vent tube openings or ports associated with liquid measuring chambers or filling valves are often necessarily located immediately above the surface of the liquid. With such machines the accumulation of foam around these openings or ports often results in improper operation of the filling devices with occasional slack filling of the containers.

The instant invention contemplates overcoming these difficulties by providing means for deflecting the foam on the surface of the liquid, away from the immediate vicinity of the involved openings or ports.

An object, therefore, of the invention is the provision in a machine for filling liquids into containers, of devices which operate to deflect and hold back any foam that may form on the liquid being filled in the region of the filling elements so that the foam will be prevented from entering the filling elements with the liquid and thereby prevent slack filling of the container.

Numerous other objects and advantages of the invention will be apparent as it is better understood from the following description, which, taken in connection with the accompanying drawing, discloses a preferred embodiment thereof.

Figure 2:
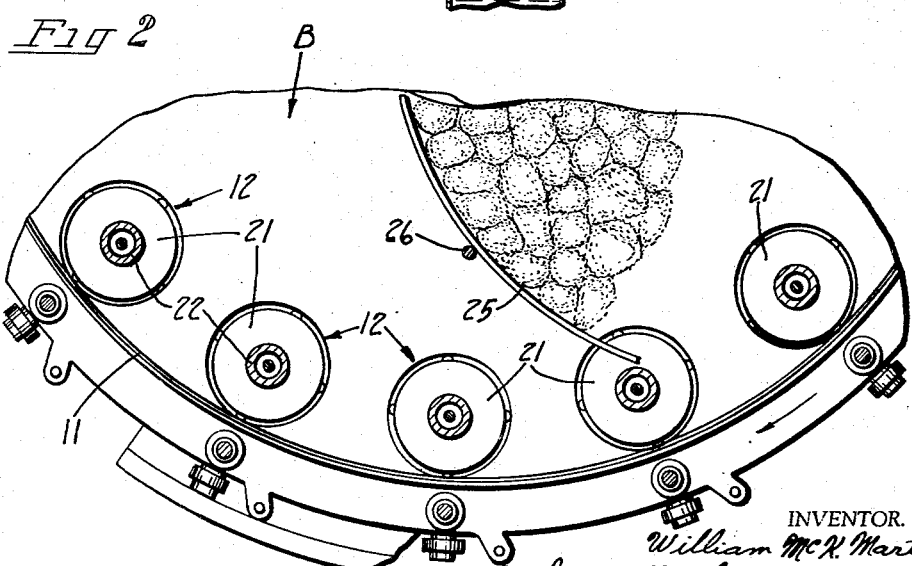

Referring to the drawing:

Figure 1 is a vertical sectional view of a portion of a liquid filling machine embodying the instant invention, with parts broken away; and Fig. 2 is a plan or horizontal section taken substantially along the broken line 2—2 in Fig. 1, with parts broken away.

As a preferred embodiment of the invention the drawing illustrates principal parts of a milk filling machine of the character disclosed in United States Patent 2,222,617, issued November 26, 1940, to J. M. Hothersall et al., on Filling machine. Such a machine fills accurately measured charges of milk into fibre containers A (Fig. 1).

The milk, designated by the letter B, to be filled into the containers A is preferably retained in a rotatable reservoir or tank 11 which is formed adjacent its outer periphery with a plurality of spaced depending hollow filling heads 12. The bottom of each head is fitted with a cap 13 having a depending filling nozzle 14 with a vertically movable valve 15. The nozzle is adapted to be inserted into a container A to be filled.

Each filling head 12 contains a vertically movable hollow bottle shaped measuring element 21 having an open bottom and having a reduced diameter tubular neck or levelling tube 22 which extends up through the milk in the tank 11 and projects above the surface of the milk. The levelling tube is formed with a pair of oppositely disposed measuring ports 23 which are located just above the surface of the milk in the tank.

When the machine is in operation and the valve 15 in the nozzle 14 is closed, the measuring element 21 is lifted vertically sufficiently to permit milk to flow from the tank into the measuring element through its open bottom. The milk accordingly fills the measuring element to the level of the milk in the tank. This level in the measuring element is just below the levelling ports 23 in the levelling tube 22.

When filled, the measuring element moves down against the filling head cap 13 and its bottom is thereby closed off from the tank. This segregates the milk in the measuring element from that in the tank. The downward movement of the measuring element also forces some of the segregated milk up into the levelling tube 22 so that some of it will overflow back into the tank through the levelling ports 23. When the overflowing has ceased there is left remaining in the measuring element a predetermined and accurately measured charge of milk. The valve 15 is then opened and the measured charge of milk discharges into the waiting container A by way of the nozzle 14.

Agitation of the milk in the tank usually forms foam on the surface of the milk. In order to prevent this foam from being drawn down into the measuring element 21 through the levelling ports 23 when the measured charge of milk empties out into the container A, the foam is deflected away from the levelling tube and is held back so that it cannot enter the ports 23.

Deflection of the foam is preferably brought about by a curved stationary baffle plate 25 which is located in the tank. The lower edge of the plate is closely adjacent but not touching the surface of the milk in the tank. The plate is supported on a bracket rod 26 which is secured to the main frame of the machine in any suitable manner. This plate is located at the filling station of the machine and extends across the path of travel of the levelling tube 22 inwardly toward the center of the machine.

Hence as the tank 11 rotates and brings each filling head 12 in succession into position at the filling station to empty its measured charge of milk into its container A, the stationary baffle plate 25 keeps the foam away from the levelling ports 23 in the levelling tubes of the measuring elements 21 which are passing into filling position. This prevents the foam from being drawn down into the measuring elements where it would interfere with accurate measuring functions on the next and following cycles of the filling head.

The foam which is held back by the baffle plate 25 also serves as a cushion for the milk which discharges from the levelling ports 23 during the downward movement of the measuring element 21 while the latter measures and segregates the charge of milk to be filled into the container. This milk which discharges into the foam is protected, by the foam as a blanket, from the air as the milk stream falls onto the surface of the milk in the tank 11. In this way by preventing the air from being entrapped and carried down into the milk, the mechanical incorporation of additional air in the milk is prevented.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In a machine for filling foam producing liquids into containers, the combination of a rotating tank for retaining a quantity of the liquid for filling into containers, a plurality of spaced filling heads carried with said tank adjacent its outer edge and movable through a container filling station, a measuring element in each of said filling heads for holding a measured quantity of said liquid, a levelling tube on each of said measuring elements, said levelling tubes having levelling ports just above the surface level of the liquid in the tank, and a stationary imperforate baffle plate of arcuate configuration supported exteriorly of and depending into said tank and extending across the tank adjacent the filling station, said baffle plate having its inner edge disposed parallel with and spaced closely above the surface level of the liquid in the tank for deflecting and preventing contact of surface foam with said filling heads at the filling station as the rotating tank carries said heads with their levelling tubes through said station, thereby preventing the foam from entering the levelling ports in a said tube.

2. In a machine for filling foam producing liquids into containers, the combination of a rotatable tank for retaining a quantity of the liquid, means carried by said tank adjacent its periphery for filling the liquid into containers, and a stationary imperforate baffle plate supported exteriorly of and depending into said tank adjacent a filling station, the inner edge of said baffle plate being disposed above and closely adjacent the surface of the liquid in the tank for shielding said filling means from contact with any foam accumulation on the surface level of the liquid when said filling means are moved with said tank into filling position.

WILLIAM McK. MARTIN.